United States Patent [19]

Meyer et al.

[11] 4,401,841
[45] Aug. 30, 1983

[54] EXPLOSION RESISTANT INSULATOR AND METHOD OF MAKING SAME

[76] Inventors: Jeffry R. Meyer, Penn Hills; John S. Billings, Jr., Trafford; Harvey E. Spindle, Wilkins Township, Allegheny County; Charles F. Hofmann, Export, all of Pa., granted to U.S. Department of Energy under the provisions of 42 U.S.C. 2182

[21] Appl. No.: 228,017

[22] Filed: Jan. 23, 1981

[51] Int. Cl.³ .................... H01B 17/26; H01B 17/36
[52] U.S. Cl. .................................. 174/31 R; 29/631; 174/209; 264/257
[58] Field of Search ............... 174/30, 31 R, 142, 143, 174/152 R, 178, 181, 209; 29/631; 264/257, 273, 275; 138/140, 153, 174, 175

[56] References Cited

U.S. PATENT DOCUMENTS

| 666,586 | 1/1901 | Woolbert | 174/209 X |
|---|---|---|---|
| 786,472 | 4/1905 | Ward et al. | 174/209 X |
| 2,160,660 | 5/1939 | Hobart | 174/209 X |
| 2,289,197 | 7/1942 | Jones | 174/178 |
| 3,015,859 | 1/1962 | Bloom | 264/257 |
| 3,087,201 | 4/1963 | Williams et al. | 264/257 |
| 3,093,160 | 6/1963 | Boggs | 264/257 X |
| 3,513,253 | 5/1970 | Woods | 174/143 |
| 4,271,343 | 6/1981 | Danchin | 200/304 |

FOREIGN PATENT DOCUMENTS

| 2800208 | 11/1978 | Fed. Rep. of Germany | 174/31 R |
|---|---|---|---|
| 616265 | 3/1980 | Switzerland | 174/31 R |
| 917920 | 2/1963 | United Kingdom | 174/30 |

Primary Examiner—Laramie E. Askin
Attorney, Agent, or Firm—M. J. Moran

[57] ABSTRACT

An electrical insulator assembly and method of manufacturing same, having a generally cylindrical or conical body portion formed of a breakable cast solid insulation system and a reinforcing member having a corrugated configuration and formed of a web or mesh type reinforcing fabric. When the breakable body member has been broken, the corrugated configured reinforcing web member provides a path of escape for pressurized insulating fluid while limiting the movement of body member fragments in the direction of escape of the pressurized fluid.

11 Claims, 9 Drawing Figures

EXPLOSION RESISTANT INSULATOR AND METHOD OF MAKING SAME

GOVERNMENT CLAUSE

The United States has rights in this invention pursuant to Contract No. ET-78-C-01-3107 between the U.S. Department of Energy and Westinghouse Electric Corporation.

BACKGROUND OF THE INVENTION

1. Field of the Invention

The invention relates in general to electrical insulators and in particular to fabric reinforced insulators.

2. Description of the Prior Art

Porcelain and other electrically suitable materials for insulators that have enough mechanical strength to support themselves and the attached power lines are brittle and subject to breakage, often with explosive force. Since the insulator structures are quite large for high voltage apparatus, the potential energy of pressurized insulating gas that may be contained in the interior of the insulator is quite high. Damage to the brittle pressurized porcelain due to vandalism, accidental contact, or electrical puncture can result in catastrophic explosion of the insulator. Insulator fragments may be blown significant distances, endangering personnel as well as adjacent equipment. Cast polymeric resin insulator weather casings have been used for some applications but the high strength resins are typically nearly as brittle as porcelain—both materials are highly breakable and shatter-prone. Prior art solutions to the above dangerous conditions include putting an insulating tube over the installed insulator, and using more expensive resin materials for greater strength. An insulating tube requires additional assembly and may electrically interfere with the insulator. The higher priced resin materials are an improvement; however, known resin materials that are suitable electrically for insulator applications have relatively low tensile strength and are weak and brittle. Casting electrical insulators from fluid uncured resins allows the encapsulation of reinforcing materials such as glass fiber fabrics and other non-metallic fibers. Three problems are inherent with encapsulating reinforcing materials to increase the strength of resin insulators. The first is that a large amount of fabric is necessary to raise the strength of the finished product appreciably, thereby increasing the size of the insulator and increasing cost. If only one or two layers of a reinforcing fabric such as glass fibers are used, the fabric will rip upon fracture of the resin material and the insulator may shatter or explode just as with non-reinforced insulators. A second problem is the location and support of the fabric in the proper position during the filling of the mold with liquid resin and the gelling of the resin. This was accomplished in the prior art by means of support projections within the casting mold, with the fabric being located and held in place by the special projections. Since the tubular fabric members are firmly held by the projections in the mold, they maintained their preplaced positions as the resin system was introduced into the mold and during the subsequent curing of the cast resin insulation system. When the solidified insulator was removed from the mold, the grooves therein caused by the anchoring projections of the mold were filled with solid resin insulation to prevent the fabric members from being in contact with air. This last step was taken to overcome the third problem with encapsulating reinforcing fabrics in cast resinous insulators—a substantial covering of the outside layer of fabric with resin is necessary to provide a smooth exterior peripheral surface. The exterior of the finished insulator should present a smooth, self-cleaning, non-tracking, weather-resistant surface to the outside environment the insulator may be subjected to. Accordingly, it would be desirable to produce a fabric reinforced cast resin insulator that would limit displacement of fragments of the insulator weather casing during catastrophic failure of the insulator. Further it would be desirable if the cast resin insulator could accomplish this without encapsulating a large amount of fabric reinforcement layers so that the finished insulator would be both cost effective and of comparable size with non-reinforced insulators. It would also be desirable if the fabric reinforcement material were designed for ease of location and support during the filling of the mold with liquid resin and the gelling of the resin. Further, it would be desirable that the finished product have a thick resin covering on the outside periphery of the fabric to insure a smooth outer peripheral surface.

SUMMARY OF THE INVENTION

The present invention is an improved electrical insulator and method of manufacturing same wherein the body portion of the electrical insulator is formed of a castable resin system encapsulating a reinforcing material such as glass fiber fabric. The encapsulated reinforcing material is an open weave heavy weight fiber fabric having regular or irregular peripheral folds to provide an arrangement that may be described as corrugated, pleated, an accordion fold or a convoluted tubular shape (for expediency, throughout this application, the regular or irregular folded arrangement shall be referred to as corrugated shaped or corrugated tubular shaped). The corrugated tubular shape provides a means for releasing a pressurized fluid contained within the body of the insulator while limiting the movement of fragments of the body of the cast insulator in the direction of escape of the pressurized fluid when the breakable body has been broken. The corrugated shape of the encapsulated reinforcing material provides the above results with the use of only one or two layers of the reinforcing material thereby providing a finished insulator having the same size as a non-reinforced insulator. The corrugated configuration also provides for ease of location, i.e., support of the fabric in the proper position during the molding of the castable resin into a finished insulator. This configuration further insures a thick coating of resin over the outside layer of the fabric to insure a smooth exterior peripheral surface on the finished insulator.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF THE PREFERRED EMBODIMENTS

Figures 1, 2:
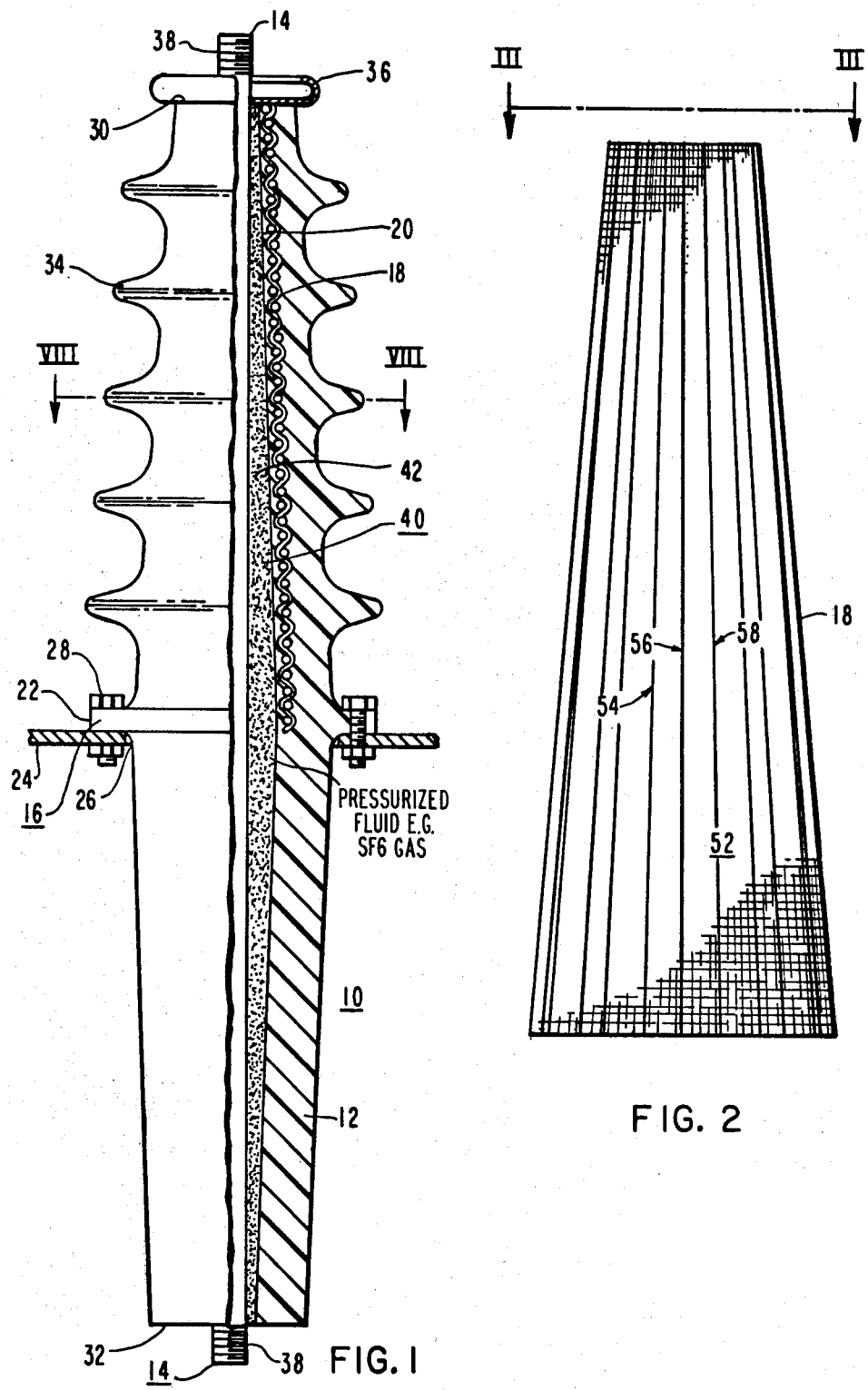
FIG. 1 is an elevational view, partially in section of an electrical insulator, constructed according to the teachings of the invention.
FIGS. 2 and 3 are an elevational view and a top view taken along section lines III—III of FIG. 2 respectively of the corrugated shaped reinforcing member according to the teachings of the invention.

Referring now to the drawings and FIG. 1 in particular, there is shown an elevational view, partially in section, of an electrical bushing assembly 10 constructed according to the teachings of the invention. In general, bushing assembly 10 includes a substantially cylindrical elongated body member or portion 12, formed of a castable electrical insulating material, an axially disposed electrical conductor or stud 14, mounting means 16, and corrugated tubular reinforcing member 18 disposed about the inner periphery 20 of body member 12. As illustrated in FIG. 1, mounting means 16 may include a flange 22 which may be a portion of the cast body member 12. The flange 22 allows bushing assembly 10 to be disposed in sealed engagement with a casing 24 of the electrical apparatus it is to be associated with, such as a transformer or a circuit breaker. For example, as shown in FIG. 1, bushing assembly 10 may be disposed perpendicularly through an opening 26 in the casing 24. The bushing assembly 10 is fixed relative to the casing 24 by suitable fastening means such as nut and bolt assemblies 28 which are disposed through openings in the shoulder or flange 22, and through corresponding openings disposed about the opening 26 in the casing 24. Or, bolts may be welded to the casing 24 which will extend upwardly through openings in the flange 22. Bushing assembly 10 shown in FIG. 1 is illustrated with the shoulder or flange 22 being an integral part of the cast body portion 12. However, the same basic structure shown in FIG. 1, except with the flange 22 being formed of a metallic insert embedded in the body member 12 at the time of casting would be equally suitable. Or, a metallic flange may be telescoped over body portion 12 of the bushing assembly 10 after it is cast, and secured thereto by a suitable adhesive such as epoxy. Other forms of mounting flanges are also used for anchoring bushing assembly 10 to specific encased electrical apparatus. The electrical conductor 14, which may be copper or aluminum, forms the axial conductor for the bushing assembly 10 and also the terminal stud, having suitable means at each end thereof, such as threads 38, for electrically connecting the bushing assembly to the enclosed electrical apparatus and also externally to the associated electrical system.

Body member 12 includes first and second ends 30 and 32, respectively, and as illustrated in FIG. 1 may have a plurality of weather sheds 34 cast integrally therewith on the weather or exposed end of the bushing. A metallic corona shield 36 may be disposed at the first end 30 of the body portion 12, which surrounds conductor 14 with a smooth rounded surface, to reduce the potential at the point where the conductor stud enters body portion 12. The resinous insulating material of which the body member 12 of bushing assembly 10 is formed may be any suitable thermosetting resin. Or, if the softening temperature is high enough, a thermoplastic resin system may even be used. The resinous epoxides have been found to be excellent in forming bushings of this type, possessing good physical strength, good weather resistant characteristics, relatively low shrinkage upon curing, good adherence to metallic inserts, and excellent resistance to cracking upon thermal cycling. Alumina trihydrate may be utilized as a filler, to obtain the necessary nontracking characteristics. A specific example of a resinous casting system which is suitable is shown in U.S. Pat. No. 3,513,253 to Woods, which patent is assigned to the same assignee as the present application.

Many electrical insulator applications require a pressurized fluid shown generally at 40 disposed in a hollow region such as region 42 defined by the body of the electrical insulator assembly such as body member 12 of insulator assembly 10. A common pressurized fluid is sulphur hexafluoride insulating gas which is used to increase insulation characteristics of the bushing. Since cast resin insulators used on high voltage applications for high voltages are quite large, the potential energy of the pressurized gas contained in the hollow region defined by the body of the insulator is quite high. Damage to the brittle pressurized insulator body due to vandalism, accidental contact, or electrical puncture can result in catastrophic explosion of the insulator body.

Cast polymeric weather casings have been used for some applications but the high strength resins are typically very brittle. Casting from relatively fluid resins such as epoxy allows the encapsulation of reinforcing materials such as glass fiber fabric or other suitable fabrics such as polyester or aramid fabrics. In order for the reinforcing fabrics to significantly reduce the danger due to catastrophic explosion of the cast resin pressure containment members, i.e. the body of the insulator, a substantial number of fabric layers are required. This increases the size of the insulator body and is particularly troublesome during the manufacture of the cast insulator due to the difficulty in supporting the reinforcing materials during the molding of the cast insulator body. Particular care must be taken in the placement of the reinforcement fabric such that a substantial portion of the cast resin material covers the exterior periphery of the outermost reinforcement layer to insure a smooth peripheral surface of the insulator weather casing body which is necessary for a self-cleaning, nontracking, weather resistant insulator. Reinforcement member 18 overcomes these troublesome aspects of the use of reinforcement fabric in cast resin insulator bodies due to the novel configuration of the reinforcement member 18.

Figure 3:
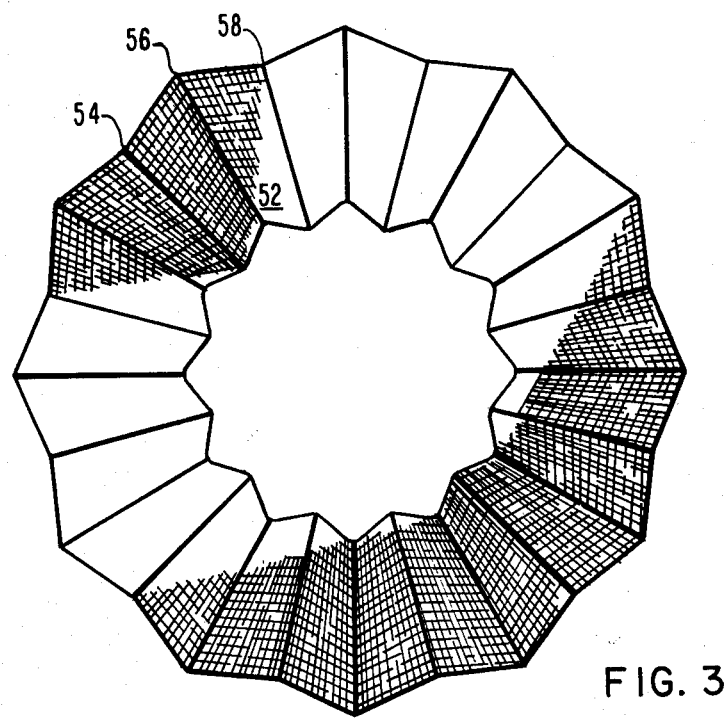

Referring now to FIGS. 2 and 3, there is shown an elevational view and top view, respectively, of tubular reinforcement fabric member 18 according to the teachings of the invention. Corrugated tubular reinforcement member 18 is formed of electrical insulating filaments such as glass fibers bonded together to form an open mesh reinforcement member so as to be suitable for embedding in the pressure containment body member 12 of cast resin insulator 10. Tubular reinforcement web 18 has a corrugated configuration as shown in FIGS. 2 and 3 having center lines, such as center lines 54, 56 and 58 of corrugation 52, and the corrugations of the corrugated member are in spaced concentric relationship about the center line of said tubular member where the electrical conductor of the bushing would be located. The novel corrugated configuration of reinforcement member 18 allows limited movement of the mesh fabric to a circular (in this case conical) configuration when the insulator 10 is subjected to puncture and explosion, the mesh then capturing or limiting the movement of body member fragments in the direction of escape of the pressurized fluid that may be disposed within the hollow region of the insulator, as explained more fully below. The novel configuration of the reinforcement fabric according to the teachings of the invention also increases the surface area to provide a large slippage factor, i.e. prevents slippage at the interface between the fabric and the resin.

As shown in FIG. 1, reinforcing fabric mesh 18 is usually disposed within the exposed or body portion of body member 12, since reinforcement mesh 18 has for its purpose the containment of fragments of cast body resin when such exposed portion of body member 12 is punctured or shattered rather than to increase the strength of body member 12 appreciably. However, it is to be understood that reinforcing fabric member 18 may extend through the entire longitudinal length of insulator 10 or be located at any predetermined position along the longitudinal length, as described more fully below.

Figure 6:
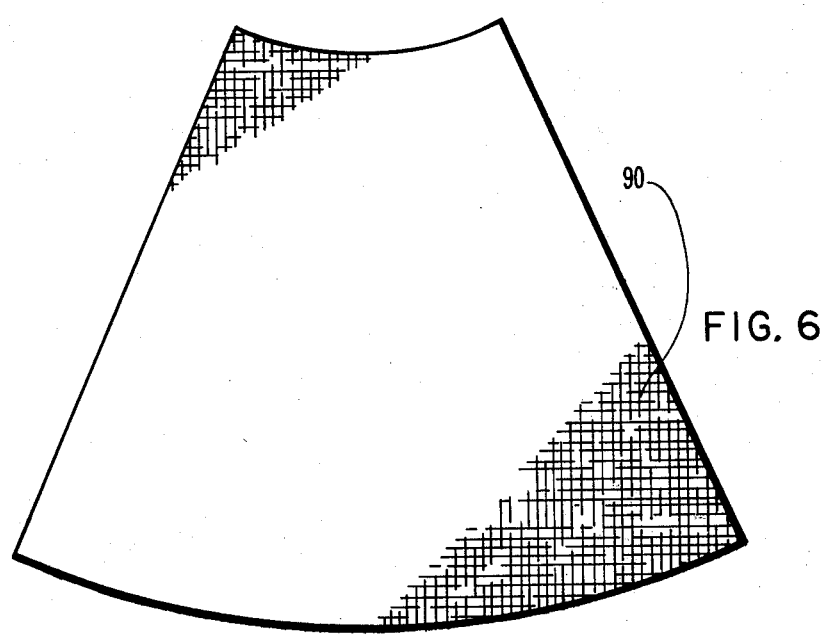
FIG. 6 is a plan view of the fabric mesh required for the corrugated shaped web that is used on the forming jig of FIGS. 4 and 5 to produce the corrugated shaped reinforcing web member according to the teachings of the invention.
Figures 4, 5:
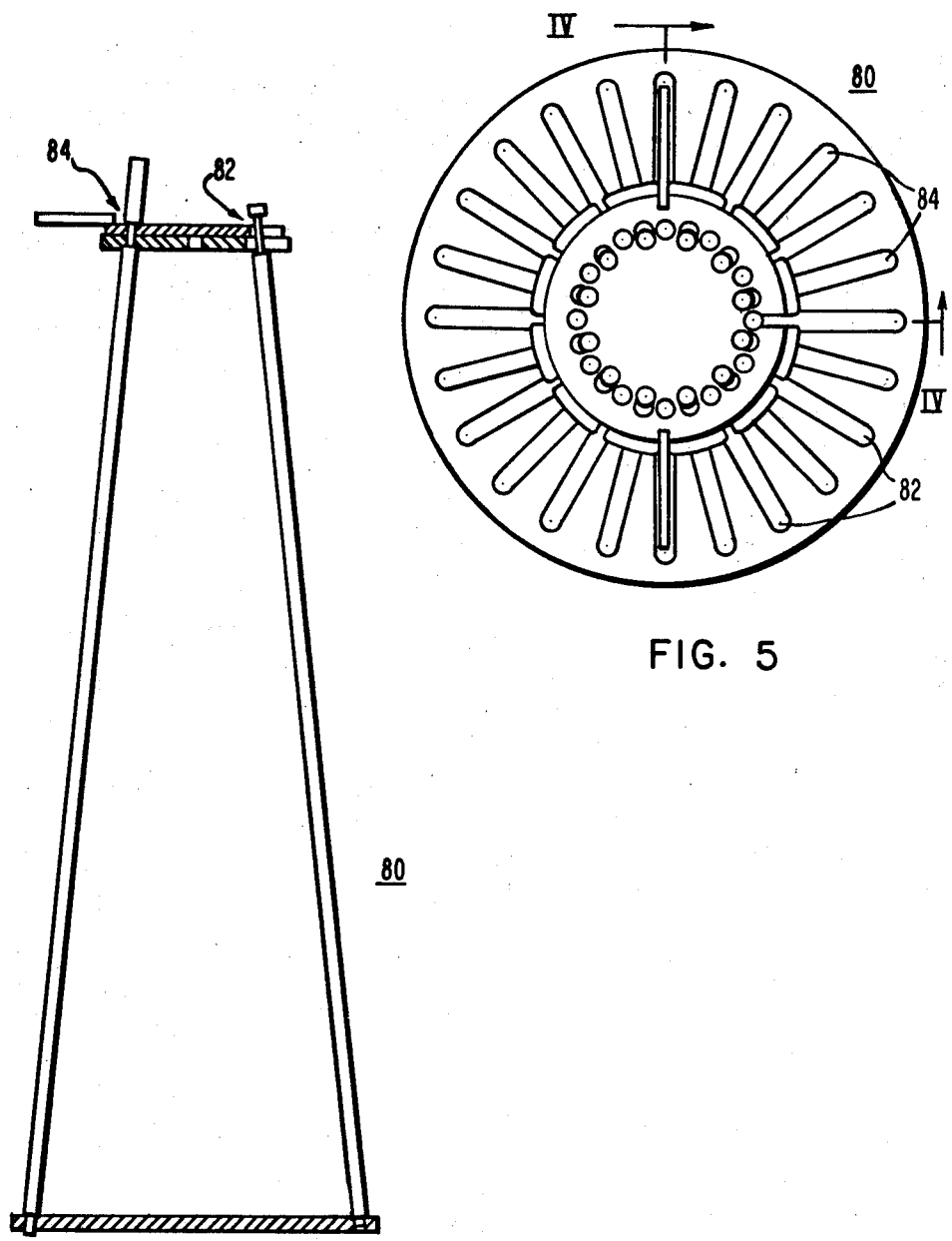
FIGS. 4 and 5 are a cross-sectional view taken along lines IV—IV of FIG. 5 and a top view respectively of a forming jig and portions of corrugated shaped reinforcing member formed thereon.

Reinforcement fabric member 18 may be formed on a forming jig or mandrel as shown in FIGS. 4 and 5 wherein forming jig or mandrel 80 includes a plurality of alternately fixed and movable rods arranged to shape the reinforcing fabric into the corrugated configuration. Movable rods are shown generally at 82 and fixed rods are shown generally at 84. Referring now to FIG. 6 there is shown uncured resin impregnated glass fiber fabric mesh 90 that may be used to form reinforcement member 18. Essentially, it is shaped by two arcs subtending angles of rotation formed by concentric radii. The circular ring segment that results would cover the periphery of a frustrum. After fabric mesh 90 has been cut into the shape as shown in FIG. 6, the movable rods of FIGS. 4 and 5 are opened to the fully outward position. One end of fabric 90 of FIG. 6 is fastened to a fixed rod and alternately the movable rods are moved back to the inward position and the fabric is draped over the next fixed rod until the completed corrugated shape of the tubular member is formed. The uncured resin corrugated tubular member is then baked along with the entire mandrel assembly in an oven to cure the resin impregnated fabric into a semi-rigid corrugated shaped fabric mesh member such as member 18 of FIGS. 2 and 3. After curing, the resin impregnated fibers will provide corrugated tubular reinforced fabric member 18 with a semi-rigid high strength wall, which will retain its strength at the elevated temperatures at which the resin system forming the body member 12 of the bushing assembly 10 is poured, gelled, and cured. The filament support fibers of reinforcing fabric 90 may also be dry wound on forming jig or mandrel 80, and subsequently impregnated with a suitable adhesive or resinous insulation system, which is cured to solidify to again form the corrugated reinforcing member 18 shown in FIGS. 2 and 3. While reinforcement member 18 has been described as being formed of epoxy impregnated glass fiber strands, it is to be understood that other insulating fibers and adhesives may be used to provide the necessary high strength corrugated tubular structure with a mesh wall, which will possess the necessary electrical characteristics and strength at forming and operating temperatures.

While the forming mandrel shown in FIGS. 4 and 5 has a frustrum configuration, it is to be understood that other configurations could be used to produce reinforcing members that take the shape of various end product insulators used in various applications such as bushings, support columns, capacitor assemblies, interrupter assemblies, etc.

The next step for producing fabric reinforced insulator assembly 10 according to the teachings of the invention is to cast insulator body member 12 out of a suitable epoxy with reinforcement member 18 disposed at a predetermined location within body member 12. The final step is the assembly of the completed components to form insulator assembly 10.

Figure 7:
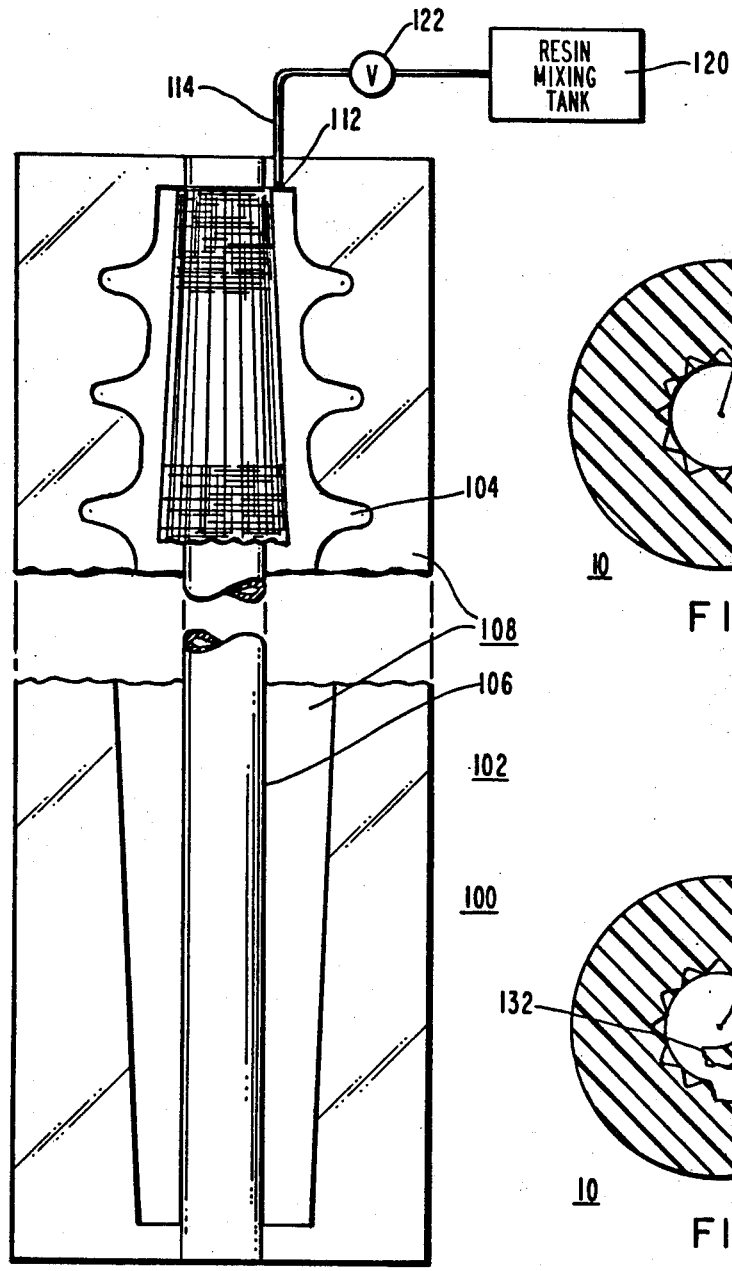
FIG. 7 is a cross-sectional view of apparatus for casting an electrical insulator with an encapsulated corrugated reinforcing web according to the teachings of the invention.

FIG. 7 illustrates apparatus for casting weather casing or body member 12 according to a method of the invention. In general, insulator mold apparatus 100 includes insulator mold 102 having mold cavity 104 formed by core center 106 and two matching outer half sections such as section 108, which sections are held together by bolts or other suitable fastening means. Core center 106 is located in the center of insulator mold 102 by the top and bottom ends of the two matching half sections 108. FIG. 7 is sectioned along the parting line of the two matching half sections, thus FIG. 7 illustrates only one of the two half sections, which is given the reference numeral 108. Parts of mold 102 in FIG. 7 are broken away along that portion of the mold which would form mounting flange 22 of insulator assembly 10. This portion of the insulator may be cast in various configurations depending on the end use product the insulator will be mounted on and is not necessary to the teachings of the invention so has been left out for purposes of illustration. Mold 102 has opening 112 disposed through the top portion of the mold matching outer half sections for receiving piping means 114 connecting resin mixing tank 120 to mold 102. A valve 122 may be located in piping means 114 to control the flow of the resin system into the mold 102. The top and bottom portions of the two mold outer half sections would formerly have circumferential projections disposed thereon for receiving and suspending the ends of tubular reinforcement members. However, because inner projections of the corrugation of the reinforcement member 18 just fit over the core center 106 to cause proper location, these required features as well as post cure filling of the crevice or groove formed by such projections have been eliminated. Similarly, previous reinforcement members had to extend the complete length of the insulator body member so that it could be suspended from these projections within the casting mold while the epoxy resin system was being introduced into the mold. Because of the unique method of location within the casting mold as described below, corrugated reinforcement member 18 may be formed to any predetermined longitudinal length and disposed at any predetermined location within body member 12.

Thus, in assembling casting mold 102, corrugated reinforcement member 18 would be disposed snugly around a predetermined portion of mold center core 106. The two mold outer half sections would be assembled with mold center core 106 having reinforcement member 18 disposed at the predetermined location within mold cavity 104 due to the snug fit over center core 106. The mold assembly 100 is heated to approximately the pouring temperature of the resin system, which is usually in the range of 80° to 110° C. for the specific resin formulation hereinbefore referred to. The mold assembly and reinforcement member 18 are held at this elevated temperature for a predetermined period of time which is sufficient to insure that moisture has been removed from the mold and reinforcement member 18.

The resin system is mixed in the mixing tank 120 at an elevated temperature which again is dependent upon the resin system used, in the range of 80° to 110° C. At this temperature the resin mixture is fluid and will readily flow through piping means 114 when valve 122 is opened allowing the resin system to enter mold cavity 104 through top cover opening 112. The fluid resin system will flow about mold cavity 104 and reinforcement member 18, and through the openings in the mesh of reinforcement member 18 as it is allowed to rise until it completely fills mold cavity 104. Mold 102 is then removed and placed in a suitable oven to gel the potted resin system. A typical gel cycle for epoxy resin systems is about 2 hours at a temperature range of 100° to 120° C. After the resin system has gelled, the cast bushing may be removed from the mold by unfastening the mold outer half sections and separating the two half sections and removing center core 106. The cast bushing would then be placed in an oven for a post cure cycle, with a typical cycle being 6 hours at approximately 135° C.

When the resin system gels and is cured, it will completely surround the corrugated tubular mesh reinforcement member 18 and extend through the plurality of openings in the mesh walls thereof. Thus, the resin system will tenaciously adhere to corrugated tubular reinforcement member 18, with no chance of pulling away from the reinforcement member during thermal cycling, which could occur if reinforcement member 18 had a smooth continuous wall. The contact between reinforcement member 18 and the resin system is not a smooth and continuous curved plane, but has a large plurality of solid continuous fingers of resin which project through the mesh wall and which are integral with solid resin disposed on each side of the mesh wall portion. This interface between the reinforcement member 18 and cast body member 12 of insulator assembly 10 is critical for dissipating the energy which may be released when cast body member 12 is pierced by a projectile or other outside force.

Figure 8:
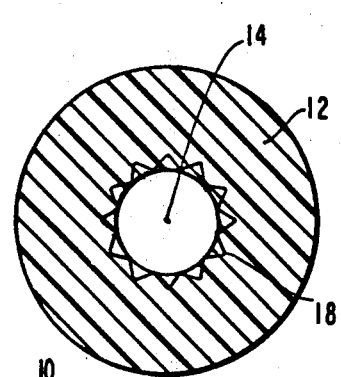
FIG. 8 is a cross-sectional view taken along section lines VIII—VIII of FIG. 1 of an electrical insulator according to the teachings of the invention prior to fracture.
Figure 9:
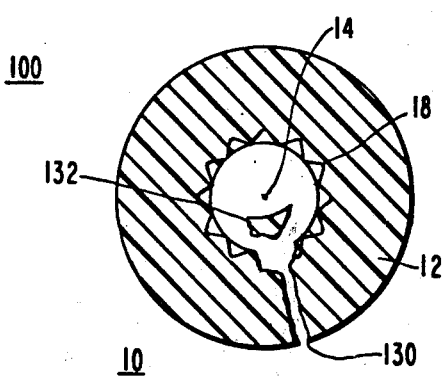
FIG. 9 is a cross-sectional view of an electrical insulator according to the teachings of the invention after fracture.

FIG. 8 is a cross-section of cast bushing assembly 10 showing the structural relationship between cast body member 12 and reinforcement member 18 of insulator assembly 10. FIG. 9 is another cross-sectional view of bushing assembly 10 this time showing what occurs when cast body member 12 is pierced by an outside force. Cast body member 12 cracks at the point of incidence of this external projectile or force shown generally at 130, but rather than shattering and fragments being hurled in the direction of the escaping insulating fluid 40, the mechanical failure of insulator body member 12 is limited to that portion of the insulator that has been subject to damage and related shock induced fracture or cracking of the remainder of cast body member 12, thereby allowing only limited fracture of cast body member 12. Corrugated reinforcement mesh 18 is the structural member that prevents explosions, i.e. it continues to be bonded to the resin epoxy after a crack occurs, limiting mechanical failure of the insulator to a crack or fracture. As shown in FIG. 9, a tremendous amount of energy is dissipated when the corrugated shape or configuration of reinforcement member 18 allows limited movement and tends to straighten out into a larger radius cylindrical or conical shape. Therefore, the larger pieces of cast member 12 which formerly were subject to shatter and could fly hundreds of feet in the direction of escape of the insulating pressurized fluid, do not break away but only fracture or crack in place thereby providing a path of escape for pressurized insulating fluid 40. The interlocking fingers of resin through reinforcement mesh 18 prevents the larger outside resin pieces from flying off. Smaller pieces of resin inside reinforcement member 18 shown generally at 132 may break away but will be contained within insulator assembly 10.

It is to be understood that an external force which has been described is one of many possible causes of mechanical failure of an insulator body. Reinforcement members will have the same effect upon failure due to any cause whether internal (such as pressure buildup, electrical discharge puncture, casting flaw, etc.) or external.

In conclusion, the corrugated configuration of reinforcement fabric member 18 within cast body member 12 of insulator assembly 10 has many advantages. For example, reinforcement fabric member 18 prevents the outside pieces of the insulator body 12 from flying off during a shattering of the insulator body member due to an internal or external force. A tremendous amount of energy is dissipated when the corrugated shape tends to straighten out into a larger radius circular/conical shape, dissipating the energy stored in the pressurized fluid contained in the hollow region of the insulator body member 12 while providing a path of escape for the pressurized insulating fluid present in the interior of the insulator. Another advantage is that corrugated-shaped reinforcement web member 18 lends itself to a superior method of production of cast reinforced insulators. Reinforcement member 18 can be located anywhere along the longitudinal length of the insulator. The corrugated shape of the reinforcement member 18 enables the innermost projections of the corrugations of reinforcement member 18 to be sized to fit snugly over the center core of the insulator casting mold thereby permitting simple location of reinforcement member 18 anywhere along the longitudinal length of the cast reinforced body member 12. This eliminates the need for the costly and time consuming former method of temporary placement and later removal of special projections for retaining the reinforcement member in the proper position within the casting mold. It provides for locating the reinforcement member 18 near the interior of body member 12 so a thick resin covering is present on the exterior of the fused insulator.

Although the body member and the reinforcing member of the preferred embodiments described herein have a generally cylindrical or conical configuration, it is to be understood that these members can take any shape without departing from the teachings of the invention. The important thing is for the reinforcing member to be made from a web or mesh reinforcing fabric and to have a corrugated configuration.

We claim:

1. An electrical insulator assembly, comprising:

(a) a body member formed of a cast electrical insulating material; and (b) an open mesh web reinforcement member being embedded in said body member, said web reinforcement member having a corrugated tubular configuration to allow movement of said open mesh web reinforcement member without tearing upon fracture of said cast electrical insulating material so that said open mesh web reinforcement member will limit displacement of fragments of said cast electrical insulating material.

2. An electrical insulator assembly comprising: a self-supporting pressure containment member of breakable electrical insulating material having an enclosed hollow region defined by the body of said pressure containment member, said electrical insulating material being brittle and subject to fragmentation;

pressurized fluid disposed in said hollow region;

an electrical conductor disposed in said hollow region and communicating with a region outside of said body member;

a web reinforcement member of electrical insulating filaments bonded together to form an open mesh web, said web reinforcement member being embedded in said pressure containment member such that said electrical insulating material surrounds said filaments, said web reinforcement member having a corrugated tubular configuration to allow movement of said open mesh without tearing of said insulating filaments upon fracture of said electrical insulating material so that said open mesh will limit displacement of fragments of said electrical insulating material while allowing release of said pressurized fluid from said pressure containment member when said pressure containment member has been broken.

3. The electrical insulator assembly of claim 2 wherein the inside center lines of the corrugations of said corrugated web reinforcement member are in spaced concentric relation about said electrical conductor at a predetermined radius to permit locating the web reinforcement member in a predetermined position within an insulator casting mold having a center core, said predetermined radius being selected to fit snugly over the center core of said insulator casting mold.

4. The electrical insulator assembly of claim 3 wherein the corrugated web reinforcement member has the arcuate peripheral surface of a frustrum configuration having a corrugated peripheral surface with the center lines of the corrugations being in spaced, concentric relation about the electrical conductor.

5. The electrical insulator assembly of claim 2 wherein said pressure containment member has first and second ends, an outside periphery, and an inside periphery, and the corrugations of said corrugated web reinforcement member form outside and inside peripheries of said web reinforcement member;

said corrugated web reinforcement member having a predetermined length and extending axially intermediate said first and second ends at a predetermined location within said pressure containment member;

said inner periphery of said web reinforcement member being located radially adjacent and contiguous with said inner periphery of said pressure containment member with the center lines of the corrugations being in spaced concentric relation about said electric conductor;

said outer periphery of said web reinforcement member being located intermediate said inner and outer peripheries of said pressure containment member such that said outer periphery of said web reinforcement member is covered with a substantial thickness of electrical insulating material.

6. The electrical insulator assembly of claim 2 wherein the electrical insulator filaments of said web reinforcement member are glass fibers.

7. The electrical insulator assembly of claim 2 wherein the electrical insulating material is cast epoxy resin.

8. A method for making an electrical insulator assembly, comprising the steps of:

forming an open-weave fabric into a semi-rigid, tubular corrugated-shaped member with the inside periphery of the innermost projections of the corrugations of the corrugated tubular member sized to fit snugly over the center core of an insulator casting mold;

disposing said semi-rigid tubular corrugated-shaped member snugly around a predetermined portion of the center core of an insulator-casting mold;

applying outer half sections of an insulator casting mold around the center core and said semi-rigid tubular corrugated-shaped member to form a completed casting mold;

filling the casting mold with a liquid resin;

curing the resin within the casting mold to form an insulator body member; and removing the casting mold from the cured electrical insulator to produce an electrical insulator having a corrugated-shaped reinforcing fabric member at a predetermined location within the insulator body member.

9. The method of claim 8 wherein the curing step includes baking the resin filled mold insulator assembly in an oven at 100° for 120 minutes and cooling the mold insulator assembly to ambient temperature.

10. The method of claim 8 wherein the forming of the fabric into a semi-rigid corrugated-shaped tubular member step includes:

using a forming jig having a plurality of alternately fixed and movable rods arranged to shape said fabric into a corrugated configuration, said movable rods being movable between an outward open position and an inward closed position, opening said movable rods to the fully outward position, fastening one end of the fabric to a fixed rod and alternately moving a movable rod back to the inward position and draping the fabric over the next fixed rod until the completed corrugated-shaped tubular member is formed, impregnating the fabric with resin, and baking the entire assembly in an oven to cure the resin impregnated fabric into a semi-rigid corrugated-shaped tubular member.

11. The method of claim 10 wherein the forming of the fabric into a semi-rigid, corrugated-shaped tubular member includes cutting uncured resin-impregnated fabric along concentric radii and two arcs subtending angles of rotation of said concentric radii such that the circular ring segment that results would cover the periphery of a frustrum prior to disposing the fabric over the forming jig.

* * * * *